(12) United States Patent
Björklund et al.

(10) Patent No.: US 8,493,866 B2
(45) Date of Patent: Jul. 23, 2013

(54) REDUNDANT COMPUTERS AND COMPUTER COMMUNICATION NETWORKS IN A HIGH-VOLTAGE POWER TRANSMISSION SYSTEM

(75) Inventors: Hans Björklund, Ludvika (SE); Krister Nyberg, Smedjebacken (SE)

(73) Assignee: ABB Technology AG, Zürich (CH)

( * ) Notice: Subject to any disclaimer, the term of this patent is extended or adjusted under 35 U.S.C. 154(b) by 393 days.

(21) Appl. No.: 12/600,310
(22) PCT Filed: May 13, 2008
(86) PCT No.: PCT/EP2008/055806
§ 371 (c)(1), (2), (4) Date: Nov. 16, 2009
(87) PCT Pub. No.: WO2008/138919
PCT Pub. Date: Nov. 20, 2008

(65) Prior Publication Data
US 2010/0158001 A1 Jun. 24, 2010

Related U.S. Application Data

(60) Provisional application No. 60/924,417, filed on May 14, 2007, provisional application No. 60/924,416, filed on May 14, 2007.

(51) Int. Cl.
*H04L 12/26* (2006.01)
(52) U.S. Cl.
USPC .......................................... 370/236
(58) Field of Classification Search
USPC .............. 370/351, 389–390, 229–230, 231, 370/235, 236; 709/248, 223–224, 238, 243–244, 709/249, 250; 340/500, 531, 533, 538; 363/13, 363/34, 35, 50, 51
See application file for complete search history.

(56) References Cited

U.S. PATENT DOCUMENTS

| 4,974,150 A | 11/1990 | Long et al. |
| 7,080,151 B1 * | 7/2006 | Borella et al. ............. 709/230 |

(Continued)

FOREIGN PATENT DOCUMENTS

| EP | 1659465 A2 | 5/2006 |
| EP | 1708445 A1 | 10/2006 |

(Continued)

OTHER PUBLICATIONS

"It's time to connect", Feb. 2006, ABB Power Technologies AB, pp. 1-81.*

(Continued)

*Primary Examiner* — Omar Ghowrwal
(74) *Attorney, Agent, or Firm* — Venable LLP; Eric J. Franklin

(57) ABSTRACT

A method for sending signals from an active computer in a high-voltage power transmission system including active protection computers and active and standby control computers in a hierarchical structure having at least two hierarchical levels. A high-voltage power transmission system and a control station for at least a part of such a transmission system. In the system all computers on the various hierarchical levels are connected to at least two separate computer communication networks. An active computer sends signals that are to be received by at least one other computer at the same or another hierarchical level simultaneously on the two separate computer communication networks to which it is connected.

16 Claims, 3 Drawing Sheets

U.S. PATENT DOCUMENTS

| | | | |
|---|---|---|---|
| 7,428,353 B1 * | 9/2008 | Milanovic et al. | 385/18 |
| 2003/0120716 A1 | 6/2003 | McClellan et al. | |
| 2005/0001693 A1 * | 1/2005 | Berkman | 333/24 R |
| 2005/0047391 A1 | 3/2005 | Tuxen | |
| 2005/0135421 A1 | 6/2005 | Chang et al. | |
| 2007/0106754 A1 * | 5/2007 | Moore | 709/217 |

FOREIGN PATENT DOCUMENTS

| | | |
|---|---|---|
| GB | 2426165 A | 11/2006 |
| WO | WO-2006/128400 A1 | 12/2006 |
| WO | WO-2008/036303 A2 | 3/2008 |

OTHER PUBLICATIONS

Bengt Jansson et al; "Kontek HVDC Interconnection"; IEE, 1996; pp. 118-123.

B. Nicol et al.; "Win-TDC The State-of-the-Art Control and Protection System for HVDC Applications"; IEEE; 2005; pp. 1-5.

Leandro Bertoni et al.; "MACH2—Modular Advanced Control 2nd Edition"; IEEE; 2004; pp. 1-6.

Jim Y. Cai et al.; "Current Status and Experience of WAMS Implementation in North America"; IEEE; 2005; pp. 1-7.

J. D. Ainsworth; "Telecommunication for h.v.d.c. control"; GEC Journal of Science & Technology, vol. 48, No. 3, 1982; pp. 159-162.

Yue Yuan et al.; "A Real-time Monitoring Method for Power System Steady State Angle Stability based on WAMA"; IEEE; 2005; pp. 1-4.

IEEE Standard for Synchrophasors for Power Systems; Mar. 22, 2006; 4 pages.

M. Davies; "Latest Control and Protection Innovations Applied to the Basslink HVDC Interconnector"; IEE; 2006; pp. 30-35.

Erik Venter et al.; "A Distributed Sequential Control for the Apollo HVDC Substation"; IEEE; 2006; pp. 879-873.

International Search Report—Sep. 22, 2008.

Written Opinion of the International Searching Authority—Sep. 22, 2008.

International Preliminary Report on Patentability—Aug. 31, 2009.

* cited by examiner

REDUNDANT COMPUTERS AND COMPUTER COMMUNICATION NETWORKS IN A HIGH-VOLTAGE POWER TRANSMISSION SYSTEM

CROSS-REFERENCE TO RELATED APPLICATIONS

This application claims priority to U.S. provisional patent application 60/924,417 filed 14 May 2007 and to U.S. provisional patent application 60/924,416 filed 14 May 2007 and is the national phase under 35 U.S.C. §371 of PCT/EP2008/055806 filed 13 May 2008.

FIELD OF INVENTION

The present invention generally relates to computer and computer communication network redundancy in a control and protection system of a high-voltage power transmission system. The present invention more particularly relates to a method for sending signals from an active computer in a high-voltage power transmission system comprising active protection computers as well as active and standby control computers. The present invention further relates to a high-voltage power transmission system as well as to a control station for at least a part of such a high-voltage power transmission system.

BACKGROUND

In high-voltage power transmission systems there is a need for fast communication between protection and control computers, especially if the system uses closed-loop control of various elements. In order to provide a reliable system it is at the same time a need for redundancy. Many power transmission systems are furthermore provided in various hierarchical levels. There may therefore be a need to provide control and protection computers in corresponding hierarchical levels. A high-voltage power transmission system may therefore also need to be controlled and monitored on various hierarchical levels.

It is known to provide redundant protection and control computers connected to redundant computer communication networks.

One type of system that uses redundant computers on various hierarchical levels for HVDC (High Voltage Direct Current) is the Win-TDC system. Win-TDC is for instance described in "WIN-TDC The State-of-the-Art Control and Protection System for HVDC Applications", Nicol, B et al., Transmission and Distribution Conference and Exhibition, Asia and Pacific, 2005 IEEE/PES, 2005, page 1-5 and in "Latest Control and Protection Innovations Applied to the Basslink HVDC Interconnector", Davis M. et al., The 8th IEEE International Conference on AC and DC Power Transmission, 2006 ACDC 2006, 28-31 Mar. 2006, page 30-35. In this system there are redundant computers connected to two redundant LANs in an Operator Control Level and in a Control & Protection Level. Here the Control and Protection level includes redundant station control systems as well as redundant pole control/DC protection systems for two poles. However there is no redundant computer communication network provided between various hierarchical control and protection levels. There is furthermore no discussion in any of the documents on how communication is performed over these redundant LANs.

In "A distributed sequential control system for the Apollo HVDC substation", Venter, F. et al., AFRICON, 1996, IEEE AFRICON 4th, 24-27 Sep., 1996, page 869-873, Vol. 2 there is described an HVDC substation with dual LANs between a control room including redundant MMIs based on UNIX work stations and redundant CPUs in Station and Pole Control as well as a single CPU in Bridge Control. In the Station and Pole Control an active CPU is connected to one LAN and a standby CPU is connected to the other LAN. The sole CPU in Bridge Control is connected to both LANs. The document also mentions that the sole bridge CPU communicates with both LANs.

The part of a high-voltage power transmission system that is perhaps most important for the reliability of a high-voltage power transmission system is here the part where control and protection is performed. There is therefore room for improvement in the design of this part of the system.

In view of what has been described above there is therefore a need for increasing the reliability of a high-voltage power transmission system.

SUMMARY OF THE INVENTION

One object of the present invention is to provide a method for sending signals from an active computer in a high-voltage power transmission system comprising active protection computers as well as active and standby control computers, which method provides increased reliability of the system.

This object is according to a first aspect of the present invention solved through a method for sending signals from an active computer in a high-voltage power transmission system comprising active protection computers as well as active and standby control computers in a hierarchical structure having at least two hierarchical levels, where all control and protection computers on the various hierarchical levels are connected to at least two separate computer communication networks, and comprising the step of:
    sending from the active computer signals that are to be received by at least one other computer at the same or another hierarchical level simultaneously on the at least two separate computer communication networks to which the active computer is connected.

Another object of the present invention is to provide a high-voltage power transmission system comprising active protection computers as well as active and standby control computers, which provides increased reliability.

This object is according to a second aspect of the present invention solved through a high-voltage power transmission system comprising active protection computers as well as active and standby control computers in a hierarchical structure having at least two hierarchical levels, wherein
    all protection and control computers on the various hierarchical levels are connected to at least two separate computer communication networks, and
    an active computer is arranged to send signals that are to be received by at least one other computer at the same or another hierarchical level simultaneously on the at least two separate computer communication networks to which it is connected.

Another object of the present invention is to provide a control station for monitoring or protecting at least a part of a high-voltage power transmission system, which control station provides increased reliability of the system.

This object is according to a third aspect of the present invention solved through a control station for monitoring or protecting at least a part of a high-voltage power transmission system and comprising active protection computers as well as active and standby control computers in a hierarchical structure having at least two hierarchical levels, wherein all protection and control computers on the various hierarchical levels are connected to at least two separate computer communication networks, and an active computer is arranged to send signals that are to be received by at least one other computer at the same or another hierarchical level simultaneously on said at least two separate computer communication networks to which it is connected.

The present invention has a number of advantages. Through the provision of redundancy regarding computers as well as computer communication networks, the reliability of the system is increased. Through a computer sending signals simultaneously on both computer communication networks to which it is connected, an even higher reliability is obtained. This may also be done without having to investigate which network is functioning and which may not be. A failure on one computer or one computer communication network will therefore not interrupt data transfer. The invention enables fast communication between control and protection computers with a limited amount of or no field buses and direct signal connections.

BRIEF DESCRIPTION OF THE DRAWINGS

The present invention will in the following be described with reference being made to the accompanying drawings, where FIG. 1 schematically shows a power transmission system including converters in which system the principles of the present invention may be applied, FIG. 2 schematically shows a number of redundant computers according to a first embodiment of the present invention in a hierarchical structure including three hierarchical control and protection levels and being connected to two redundant computer communication networks, FIG. 3 schematically shows a number of redundant computers according to a second embodiment of the present invention in a hierarchical structure including three hierarchical control and protection levels and being connected to six redundant computer communication networks, and FIG. 4 schematically shows a number of method steps being taken by an active computer connected to redundant networks according to the present invention.

DETAILED DESCRIPTION OF THE INVENTION

In the following, a detailed description of preferred embodiments of a device and a method according to the present invention will be given.

Figure 1:
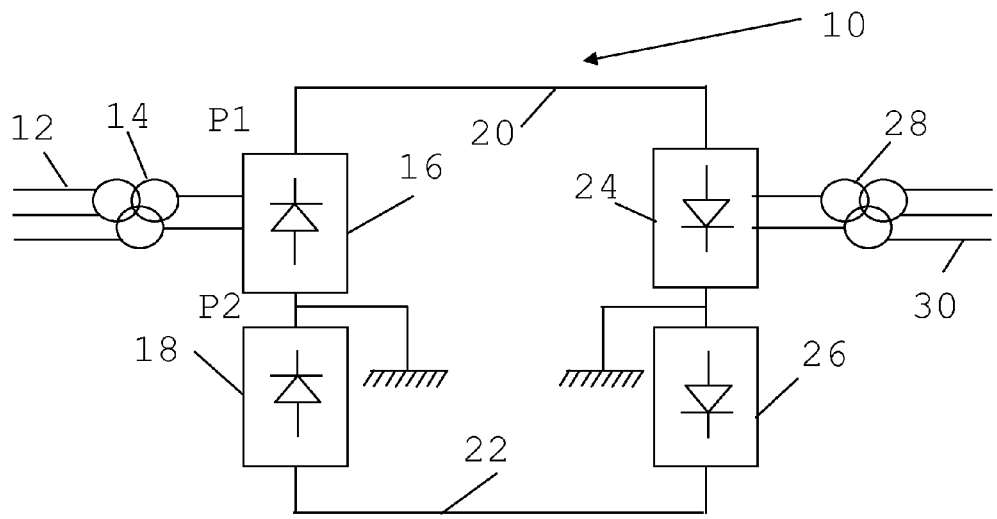

In FIG. 1 there is schematically shown a high-voltage power transmission system 10 in which the principles of the present invention may be applied. The power transmission system is in the example given in FIG. 1 a HVDC (High Voltage Direct Current) power transmission system. It should be realized that the present invention is not limited to such a system, but may be used in other types of high-voltage power transmission systems, such as for instance FACTS (Flexible Alternating Current Transmission System).

In the figure there is a first AC power line 12, which is here a three-phase power line, which leads to a first transformer 14. The first transformer 14 is connected to a first converter 16, which converts the AC voltage to a DC voltage. This first converter 16 is in turn connected to a first DC power line 20, which in turn leads to a second converter 24, which is a converter converting DC power to AC power. The second converter 24 is in turn connected to a second transformer 28.

The second transformer is in turn connected to a second AC power line 30, which is also here a three-phase power line. The first and second converters 16 and 24 are furthermore connected to ground and is also each connected, at these ground connections, to a corresponding third and fourth converter 18 and 26, which are in turn connected to a second DC power line 22. The third converter 18 is here of the same type as the first converter 16, while the fourth converter 26 is of the same type as the second converter 24. In the system in FIG. 1, the DC power lines 20 and 22 may form a DC link of at least several kilometers length in order to be used to transmit power at reduced losses over a considerable distance. However, it is also possible to use the same configuration to interconnect two AC power lines with for example different AC frequencies at one and the same location.

The system shown in FIG. 1 is a so-called bipole system, where the first DC power line 20 is provided at a first positive voltage and the second DC power line 22 is provided at a second opposite negative voltage. This means that there is a forward current path provided by the first DC power line 20 and a return current path provided by the second DC power line 22. Here the first converter 16 is thus provided as part of a first pole P1, while the third converter 18 is provided as a part of a second pole P2. However, it should be realized that it is possible to provide a monopole system instead through removing the return path provided by the second DC power line 22 and removing the third and fourth converters 18 and 26. In a monopole system the first and second converters 16 and 24 would instead only be connected between the first DC power line and ground. In this case a return path may be provided via ground.

The design and operation of the converters described above is well known and does not form a part of the present invention. However, these converters need to be controlled. They also need to be protected. Dedicated control and protection computers normally perform such control and protection. The system in FIG. 1 has three levels, a converter level, a pole level and a bipole level. In order to control the system, there does therefore often need to be control and protection provided at these levels. These computers therefore need to be provided on a number of hierarchical control and protection levels that often correspond to the system levels. In the exemplifying system in FIG. 1, there may therefore need to be redundant control and protection computers on a converter control and protection level, on a pole control and protection level as well as on a bipole control and protection level.

For security reasons these computers need furthermore be provided redundantly. In case of control computers redundancy means that there is one computer that is an active computer and another parallel computer being a standby computer, where the standby computer is ready to step in and become a new active computer as soon as an active computer becomes faulty. A standby computer may further be in so-called hot standby. This means that it performs all the functions of an active computer. However any commands that it generates are not used in controlling the system, they are inactivated. As soon as a standby computer becomes an active computer these commands are activated. This enables a quick change from standby to active of the computer in question, which is often necessary in closed-loop control. Many of the elements provided in a high-voltage power transmission system furthermore requires this type of closed-loop control, for instance current valves and breakers in a converter. In order for such closed-loop control to function properly data being sent between two computers need to be sent and acted on quickly. This is thus especially important when a standby computer becomes a new active computer. The redundant protection computers are on the other hand normally both active protection computers.

The present invention is therefore directed towards enabling system redundancy both regarding computers and computer communication networks for various hierarchical protection and control levels of a high-voltage power transmission system for providing an increased reliability.

Figure 2:
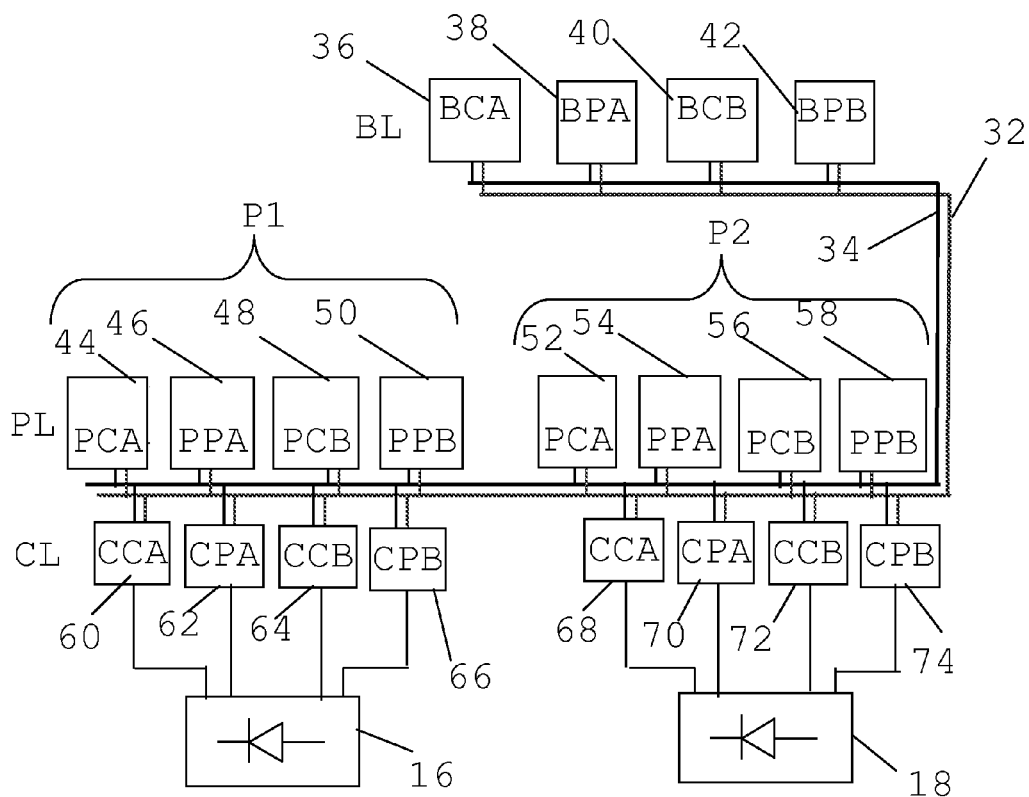

FIG. 2 schematically shows a number of redundant computers according to a first embodiment of the present invention in a hierarchical structure including three hierarchical protection and control levels, where the redundant computers are being connected to two redundant computer communication networks in order to control and protect the first and the third converter in the system shown in FIG. 1. It should here be realized that a similar type of structure with computers may be provided for the second and fourth converters in FIG. 1.

These computers are furthermore normally provided in a control station for the system, which control station is then directed towards monitoring and protecting at least a part or at least one end of the system in FIG. 1, for instance one end concerned with the conversion of AC power to DC power.

There are in the first embodiment two computer communication networks 32, 34, here two LANs (Local Area Network), provided. There is thus here a redundancy regarding computer communication networks. Each of these LANs 32 and 34 is furthermore a high-speed LAN where data is transferred at least 100 Mbps and for instance at 1 Gbps or higher. Each computer communication network 32, 34 is here furthermore separated from the other computer communication network. Each computer communication network 32, 34 here allows communication between computers on three different hierarchical control and protection levels, where the highest level is a bipole protection and control level BL, followed by a pole protection and control level PL and a third lowest level is a converter protection and control level CL.

On the bipole level BL there is a first active bipole control computer BCA 36 and active bipole protection computers BPA 38 and BPB 42 and a first standby bipole control computer BCB 40. Each computer on this level BP is connected to the first computer communication network 32 as well as to the second computer communication network 34.

On the pole level PL there is a first set of computers provided for protection and control of the first pole P1 and a second set of computers for the protection and control of the second pole P2. The first set of computers includes a first active pole control computer PCA 44, active pole protection computers PPA 46 and PPB 50 and a first standby pole control computer PCB 48. The second set here includes a second active pole control computer PCA 52, active pole protection computers PPA 54 and PPB 58 and a second standby pole control computer PCB 56. Each computer on this level PL is also connected to the first computer communication network 32 as well as to the second computer communication network 34.

On the converter level CL, there is a first set of computers provided for protection and control of the first converter 16 of the first pole P1 and a second set of computers for the protection and control of the third converter 18 of the second pole P2.

The first set of computers on the converter level CL includes a first active converter control computer CCA 60, active converter protection computers CPA 62 and CPB 66 and a first standby converter control computer CCB 64. The second set on the converter level CL here includes a second active converter control computer CCA 68, active converter protection computers CPA 70 and CPB 74 and a second standby converter control computer CCB 72. Each computer on this level CL is connected to the first computer communication network 32 as well as to the second computer communication network 34. The computers 60, 62, 64 and 66 in the first set on the converter level CL are furthermore connected to the first converter 16, for instance each using an optical point-to-point link, while the computers 68, 70 72 and 74 in the second set on the converter level CL are connected to the third converter 18, for instance each using an optical point-to point link. It should here be realized that the computers on the converter level CL may as an alternative be connected to the corresponding converter using a suitable field bus structure.

It should here be realized that the system may be simplified. In case of a monopole system, the bipole level BL with its computers may be omitted. It is furthermore possible that the converter level CL with its computers may be omitted for a pole system and instead protection and control for the converter level may be performed on the pole level. This is especially the case if there is only one converter in a pole.

Typically a computer on the converter level may obtain measurement values, indicators and alarms from control and measurement nodes connected to a part of the converter as well as provide various control commands and orders to perform measurements to such nodes. Various commands and data may furthermore be sent in signals upwards in the hierarchy to an active computer on for instance the pole level as well as to an active computer on the same level. Similarly an active computer on the pole level may send signals such as status indicators and commands to an active computer on the bipole level or on the same level as well as signals such as commands to active computers on the converter level. Naturally also active computers on the bipole level may send signals to active computers on the same or the pole level. A computer on the pole and converter level may thus also receive various signals, such as protection or control commands, from a computer on the next higher hierarchical level or from a computer on the same level. The transmission of data in this way is as such well-known within the art and not really a part of the present invention.

It should also be realized that each pole may include more converters, for instance two each, where these converters in a pole may be connected in series with each other or in parallel with each other. In this case there may be a further set of computers (active and standby) in the converter level CL for protection and control of a further converter in the first pole. The computers in this further set are then able to communicate with each other and with the first set of computers on the pole level PL. In a similar manner there may here be a further set of computers (active and standby) in the converter level CL for protection and control of a further converter in the second pole. The computers in this further set are then able to communicate with each other and with the second set of computers on the pole level PL. All these further sets of computers may then be connected to the first and the second computer communication networks and can also communicate with each other.

Figure 3:
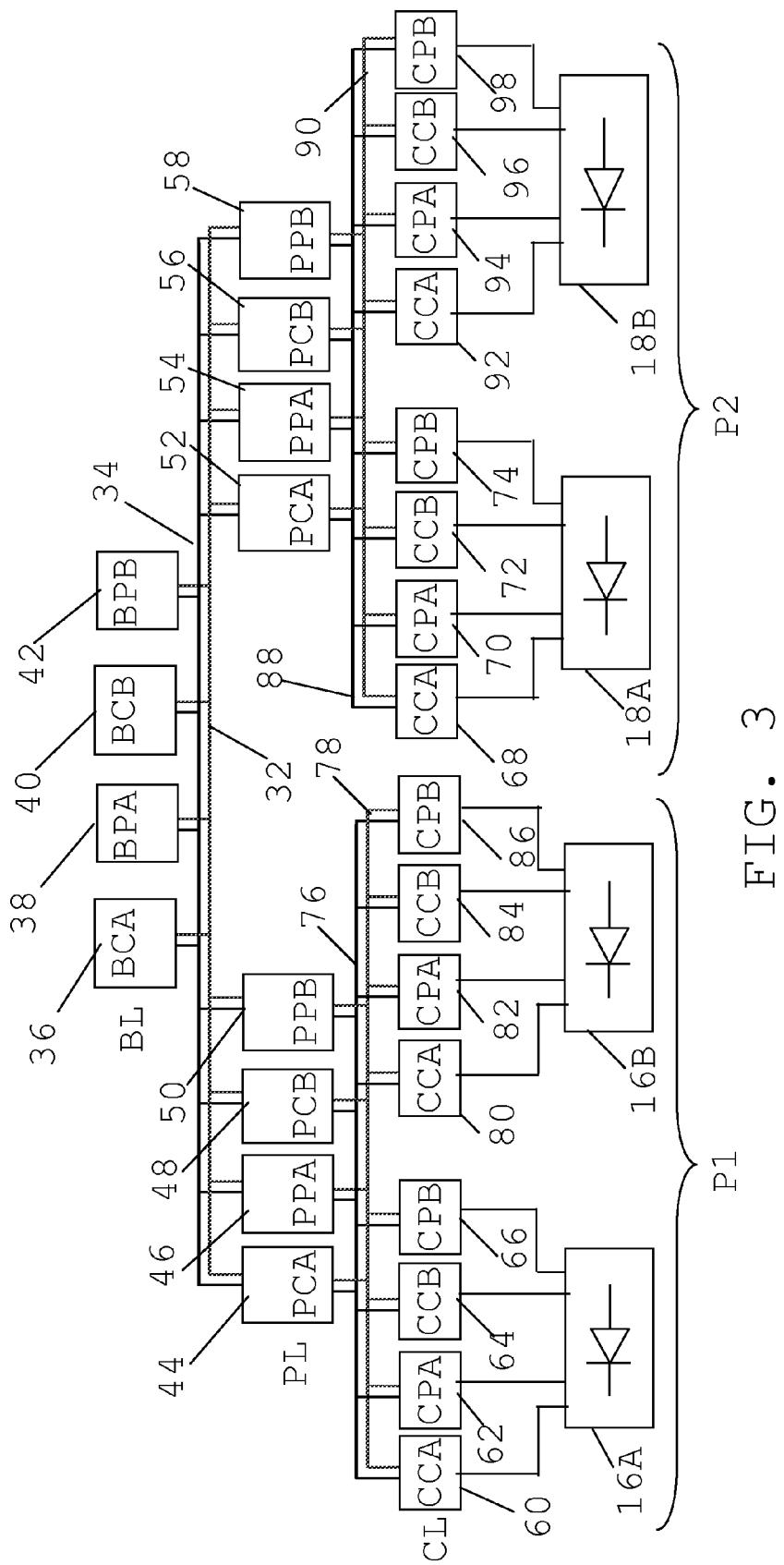

As an alternative when more converters are provided in each pole of a bipole system it is possible to provide the protection and control computers in a way according to a second embodiment of the present invention that is exemplified in FIG. 3, which shows a number of redundant computers in a hierarchical structure including three hierarchical levels. These computers are here being connected to six computer communication networks.

According to FIG. 3 the computers 36, 38, 40 and 42 on the bipole level BL and the computers 44, 46, 48, 50, 52, 54, 56 and 58 on the pole level PL are each connected to the first and the second computer control network 32 and 34 in the same way as was described above. The computers connected to these first and second networks 32 and 34, which are all the computers on the bipole and pole levels, are here provided in a first group of neighboring levels, which group thus includes the bipole level BL and the pole level PL.

However the first set of computers 44, 46, 48 and 50 on the pole level PL are here also connected to a third and fourth computer communication network 76 and 78, which may likewise be high-speed LANs. The first set of computers 60, 62, 64 and 66 on the converter level CL that control and protect a first converter 16A of the first pole P1 are here also connected to the third and fourth computer communication network 76 and 78. To this third and fourth computer communication network 76 and 78 there is furthermore connected a third set of computers on the converter level CL for the protection and control of an additional converter 16B of the first pole P1. The third set of computers includes a third active converter control computer CCA 80, active converter protection computers CPA 82 and CPA 86 and a third standby converter control computer CCB 84. The computers in the third set are furthermore connected to the further converter 16B of the first pole P1, for instance each using optical point-to-point links. The pole level and the converter level here make up a second group of neighboring levels. As is also clear from FIG. 3 one of these levels, the pole level PL is provided in both the first and the second group. All the above-mentioned computers in the first set on the pole level PL and in the first and third sets on the converter level CL being connected to the third and fourth computer communication networks 76 and 78 here make up a first section P1 of the second group of neighboring levels.

In a similar manner the second set of pole control computers 52, 54, 56, 58 is also connected to a fifth and sixth computer communication network 88 and 90, which may also be a high-speed LAN network. The second set of computers 68, 70, 72, 74 on the converter level CL that control and protect a second converter 18A of the second pole P2 are here also connected to this fifth and sixth computer communication network 88 and 90. Finally there is a fourth set of computers on the converter level CL for the protection and control of an additional converter 18B of the second pole P2. The fourth set here includes a second active converter control computer CCA 92, active converter protection computers CPA 94 and CPB 98 and a second standby converter control computer CCB 96. The computers in the fourth set are furthermore connected to the further converter 18B of the second pole, for instance each using optical point-to-point links. All these computers connected to the fifth and sixth computer communication networks 84 and 86 here make up a second section of the second group of neighboring levels.

There are thus here two separate parallel or redundant computer communication networks between all computers in the first group of levels, i.e. between all computers on the bipole and pole levels, two separate parallel or redundant computer communication networks between all computers in the first section of the second group of levels, i.e. between all computers in the pole level and converter level associated with the first pole, as well as two separate parallel or redundant networks between all computers in the second section of the second group of neighboring levels, i.e. in the pole level and converter level associated with the second pole. One reason for this change as compared with FIG. 2 is for limiting the traffic on the computer communication networks, which may otherwise become too high and lead to congestion. This may have a negative influence on the control and protection of the converters.

Figure 4:
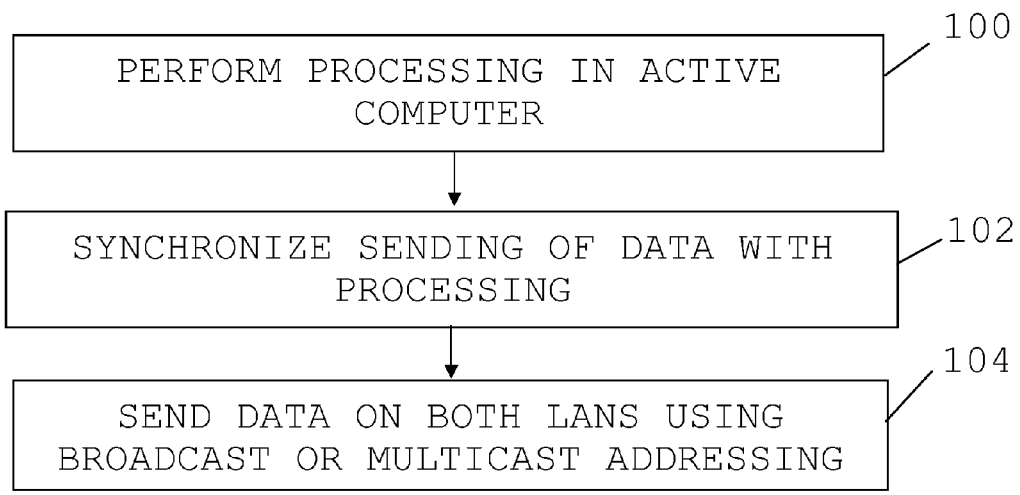

Now the operation of an active computer that may be provided in a system according to either the first or the second embodiment will be described in relation to FIG. 4, which schematically shows a number of method steps being taken by an active computer connected to two redundant computer communication networks according to the present invention.

An active computer, for instance the converter control computer CCA 60 on the converter level CL, performs some kind of processing, step 100, which may be processing in relation to measurement values obtained via the first converter 16A. In relation to this processing it may then need to send signals, for instance to a corresponding active pole control computer PCA 44 on a pole level PL or to a protection control computer CPA 62 on the same level. Such signals may include measurement values, commands and indications. Here it furthermore synchronizes this sending with the processing, step 102. As it then sends the signals it sends them simultaneously on both the computer control networks to which it is connected, step 104, which are the first and second networks 32, 34 in the example of FIG. 2 and the third and fourth networks 76 and 78 in the example of FIG. 3. It furthermore here sends these signals through broadcasting them or through multicasting them. It thus uses a broadcasting or a multicasting scheme. In case a multicasting scheme is used addressing may be made to all computers that might have an interest in them, for instance all protection computers as well as all active and standby control computers on both levels. There may here be limitations such as limitations to all computers in the same set, all computers associated with the same pole, all computers on the pole level associated with the same pole, only to computers of the same type, i.e. control computers, only computers of the opposite type, i.e. protection computers, as well as according to type in the same set, all computers according to type associated with the same pole, or according to type on the pole level associated with the same pole.

Addressing may here be performed through using the MAC-addresses of the computers. However it is also possible to use IP-addresses. As is known within the art IP-addresses are associated with a computer when being connected to a computer communication network, while a MAC address is only associated with the computer. In case multicasting using IP-addresses are used, it is then necessary to keep track of which IP-addresses of a device are associated with which network.

Some signals being sent may also be sent using a direct addressing scheme, i.e. directly addressed and sent to only one corresponding computer, however over both the accessible computer communication networks.

In case a standby computer is to become a new active computer instead of a currently active computer, taking over may be performed through handshaking between the two computers. Handshaking may here be performed via the two redundant computer communication networks to which the two computers are connected. After the hand shaking is finished the new active computer may then immediately step in as new active computer.

Automatic switch-over may be initiated through the two parallel computers on the same hierarchical level both supervising their own functionality in order to detect possible faults. The switchover commands are normally initiated from the currently active computer. By this switch over philosophy, a fault or testing activity in the standby computer cannot result in an unintentional switch over. The internal supervisions giving switch over orders includes:
- Supervision of measuring systems (e.g. DCCT, DCOCT)
- Supervision of data bus communications
- Supervision of μ-computer program execution
- Memory test of μ-computers
- Supervision of auxiliary power The active computer here initiates handing over in case faults are detected in the supervised functionality.

The active computer then hands over to the standby computer through handshaking in the previously described way. The faulty computer (the previously active computer) should thereafter be checked before being taken into operation again, now as a standby computer.

It is furthermore possible to initiate a handing over from an active control computer to a standby control computer through the use of a protection computer.

A protection computer may monitor at least one operating condition of the system, which may be the current running through the power line, the voltage of the power line or the transferred power. It should here be realized that it might monitor other parts like for instance transformers. The monitored operating condition, like for instance the current may reach a risk state, which in the case of the current is typically a current that is above a first current threshold. The protection computer would in case this risk state is reached then typically perform some type of safety measure like tripping the current through opening a breaker or issue blocking orders. A protection computer, for instance on the converter level, may order an active control computer, for instance on the converter level, to hand over control to the standby control computer with a short pick up delay if the monitored operating condition is in proximity of the risk state, i.e. is close to this state but not quite there. In the example of the current this may be that the current has exceeded a second threshold, which is provided below the first threshold. Handover is then again performed in the previously described way through handshaking between the two control computers. In case the current despite this action would reach the risk state, the protection computer may perform the safety measure for this type of risk, for instance order tripping of the current.

Through having a protection computer initiate a handover of control to a redundant control computer before a protective action is performed it is furthermore ensured that possibly undetected faults in the active control computer does not cause a protective action to be performed, but instead that the redundant control computer takes over. This provides a further enhancement of the reliability of the operation of the power transmission system. At the same time the protective action will be performed in case a risk state is actually reached. In this way the protection computer will detect abnormal operating conditions of the system. Should the abnormal condition be caused by a control fault, a switch over could thus restore the normal operating condition. This will also guard against failures in the measuring circuitry. This increases an already high reliability of the duplicated systems even further.

The invention has a number of advantages. Through the provision of redundancy regarding computers as well as computer communication networks, the reliability of the system is increased. Through a computer sending signals simultaneously on both computer communication networks to which it is connected, an even higher reliability is obtained without having to investigate which network is functioning and which may not be. A failure on one computer or one computer communication network will therefore not interrupt data transfer. In this way it is also possible to provide very fast (sub millisecond) data transfer between redundant computers. The invention also has the advantage of enabling fast communication between control and protection computers with a limited amount of or no field buses and direct signal connections. Through using broadcasting or multicasting signals may be sent to all or some computers including both active and standby computers on all levels or all levels in a section. In this way it is possible to avoid having to keep track of which receiving computer is an active or a standby computer. If broadcasting is used a sending computer does furthermore not have to keep track of the addresses to be used for sending, but can leave it to the receiving computers to decide if they are interested in the sent signals or not. This allows a fast data transfer, which is necessary when closed loop control is performed. When a standby computer receives these signals it may furthermore also directly start operating on them if it steps in as a new active computer. Therefore a smooth switch over is possible that improves closed-loop control. Synchronization in a sending computer with program execution has the further advantage of minimizing transfer delays.

Through the present invention it is furthermore possible to transfer time critical signals such as block orders, trip orders, alpha orders for converts connected in series, compensation signals between converters connected in parallel and measurement signals.

It should here be realized that there may be further computer communication networks provided in order to communicate with levels above the control and protection levels, for instance in order to connect the computers on the bipole level with operating room computers of the station. In case it is desirable to provide communication between two computer communication networks provided in parallel with each other, it is furthermore possible to connect a router between them. This may be of interest if monitoring of the networks is desirable.

From the foregoing discussion it is evident that the present invention can be varied in a multitude of ways. It shall consequently be realized that the present invention is only to be limited by the following claims.

The invention claimed is:

1. A method for sending protection or control signals from an active computer in a high-voltage power transmission system comprising a hierarchical structure comprising at least two hierarchical levels including a pole level and a converter level and active protection computers and active and standby control computers in the hierarchical structure, at least two power converters operatively interconnected with a direct current power line and connected to the control computers, and at least two separate computer communication networks to which all of the active protection computers and active and standby control computers are operatively connected, the method comprising:
   sending, from said active computer in the high-voltage power transmission system, protection or control signals that are to be received by at least one other computer at a same or another hierarchical level simultaneously on said at least two separate computer communication networks to which said active computer is connected; and
   synchronizing said sending of said protection or control signals with processing being performed in relation to said protection or control signals in said active computer,
   wherein the sending comprises sending at least some of said protection or control signals using a broadcasting or multicasting scheme so that more than one other computer can receive said protection or control signals via said two separate networks.

2. The method according to claim 1, wherein the sending comprises sending at least some protection or control signals using a direct addressing scheme.

3. The method according to claim 1, wherein all computers on all hierarchical levels are connected to the same computer communication networks.

4. The method according to claim 1, wherein all computers in a first group of neighboring levels are connected to a first and a second separate computer communication network, all computers in a first section of a second group of neighboring levels are connected to a third and a fourth separate computer communication network and all computers in a second section of the second group of neighboring levels are connected to a fifth and a sixth separate computer communication network.

5. The method according to claim 4, wherein the computers on one level are provided in both the first and the second group.

6. The method according to claim 1, wherein the control computers in the various hierarchical levels are provided for closed-loop control of system elements.

7. A high-voltage power transmission system, comprising:
a hierarchical structure comprising at least two hierarchical levels including a pole level and a converter level,
active protection computers and active and standby control computers in the hierarchical structure,
at least two power converters operatively connected to the control computers,
a direct current power line operatively interconnecting the at least two power converters,
and
at least two separate computer communication networks to which all of the active protection computers and active and standby control computers are operatively connected,
wherein an active computer is arranged to send the same protection or control signals that are to be received by at least one other computer at a same or another hierarchical level synchronized with processing being performed in relation to said protection or control signals in said active computer simultaneously on said at least two separate computer communication networks to which said active computer is connected and is arranged to send at least some of said protection or control signals using a broadcasting or multicasting scheme so that more than one other computer can receive protection or control signals via said two separate networks.

8. The system according to claim 7, wherein the active computer is arranged to send at least some protection or control signals using a direct addressing scheme.

9. The system according to claim 7, wherein all computers on all hierarchical levels are connected to the same computer communication networks.

10. The system according to claim 7, wherein all computers in a first group of neighboring levels are connected to a first and a second separate computer communication network, all computers in a first section of a second group of neighboring levels are connected to a third and a fourth separate computer communication network and all computers in a second section of the second group of neighboring levels are connected to a fifth and a sixth separate computer communication network.

11. The system according to claim 10, wherein the computers on one level are provided in both the first and the second group.

12. The system according to claim 7, wherein the control computers in the various hierarchical levels are provided for closed-loop control of system elements.

13. The system according to claim 7, further comprising:
a router interconnecting the at least two separate computer communication networks.

14. The system according to claim 7, wherein the system is a DC power transmission system.

15. The system according to claim 7, wherein the system operates at voltages around 800 kV.

16. A control station for monitoring or protecting at least a part of a high-voltage power transmission system, the control station comprising:
a hierarchical structure comprising at least two hierarchical levels including a pole level and a converter level,
active protection computers and active and standby control computers in the hierarchical structure,
at least two power converters operatively connected to the control computers,
a direct current power line operatively interconnecting the at least two power converters,
and
at least two separate computer communication networks to which all of the active protection computers and active and standby control computers are operatively connected,
wherein an active computer is arranged to send protection or control signals that are to be received by at least one other computer at the same or another hierarchical level synchronized with processing being performed in relation to said protection or control signals in said active computer simultaneously on said at least two separate computer communication networks to which it is connected and is arranged to send at least some of said protection or control signals using a broadcasting or multicasting scheme so that more than one other computer can receive protection or control signals via said two separate networks.

* * * * *